United States Patent
Fukuda (10) Patent No.: US 8,617,753 B2
(45) Date of Patent: Dec. 31, 2013

(54) FUEL CELL SYSTEM WITH VOLTAGE SENSOR

(75) Inventor: Takashi Fukuda, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1149 days.

(21) Appl. No.: 12/174,233

(22) Filed: Jul. 16, 2008

(65) Prior Publication Data

US 2008/0280176 A1   Nov. 13, 2008

Related U.S. Application Data

(63) Continuation of application No. 10/568,286, filed as application No. PCT/JP2004/011803 on Aug. 11, 2004, now abandoned.

(30) Foreign Application Priority Data

Sep. 25, 2003   (JP) ................... 2003-333656

(51) Int. Cl.
  *H01M 8/04*   (2006.01)
(52) U.S. Cl.
  USPC ........... 429/428; 429/413; 429/415; 429/429; 429/430; 429/432; 429/434
(58) Field of Classification Search
  USPC .......... 429/413, 415, 429, 430, 432, 428, 434
  See application file for complete search history.

(56) References Cited

U.S. PATENT DOCUMENTS

| | | | |
|---|---|---|---|
| 3,666,562 A | 5/1972 | Sprengel | |
| 6,106,962 A | 8/2000 | Pedicini et al. | |
| 6,960,401 B2 | 11/2005 | Barton et al. | |
| 2001/0014415 A1 | 8/2001 | Iio et al. | |
| 2001/0055705 A1 | 12/2001 | Yagi | |
| 2002/0094467 A1 | 7/2002 | Nonobe et al. | |

FOREIGN PATENT DOCUMENTS

| | | |
|---|---|---|
| EP | 1 187 241 A2 | 3/2002 |
| JP | 2001-307757 A | 11/2001 |
| JP | 2002-093438 A | 3/2002 |
| JP | 2002-243417 A | 8/2002 |
| JP | 2002-260704 A | 9/2002 |
| JP | 2002-280027 | 9/2002 |
| JP | 2003-115314 A | 4/2003 |
| JP | 2003-151588 A | 5/2003 |
| JP | 2003-157874 | 5/2003 |
| JP | 2003-243020 A | 8/2003 |
| WO | WO-03/010845 A2 | 2/2003 |

OTHER PUBLICATIONS

Notification of Reasons for Refusal in JP Appln No. 2003-333656 dated Nov. 29, 2010.

*Primary Examiner* — Patrick Ryan
*Assistant Examiner* — Alex Usyatinsky
(74) *Attorney, Agent, or Firm* — Foley & Lardner LLP (57) ABSTRACT

A fuel cell system (1) which includes: a fuel cell (2) to be supplied with a gas for power generation, the gas unused for the power generation to be discharged out of the fuel cell (2); a circulation flow path (8) through which the discharged gas is resupplied to the fuel cell (2); a variable flow rate circulation pump (6) for circulating the gas through the circulation flow path (8); a valve (7) for discharging the gas in the circulation flow path (8) to the outside thereof; a voltage sensor (22) for measuring voltage of the fuel cell (2); and a controller (32) for controlling the circulation pump (6) and the valve (7). The circulation pump (6) and the valve (7) are controlled based on the voltage (CV) measured by the voltage sensor (22).

9 Claims, 5 Drawing Sheets

FUEL CELL SYSTEM WITH VOLTAGE SENSOR

CROSS-REFERENCE TO RELATED APPLICATIONS

The present application is a Continuation of U.S. application Ser. No. 10/568,286, filed Feb. 16, 2006, which is based upon PCT National Stage Application No. PCT/JP2004/011803 filed Aug. 11, 2004, and claims the benefit of priority from prior Japanese Patent Application No. 2003-333656, filed Sep. 25, 2003, and the entire contents of each of these applications are incorporated herein by reference.

TECHNICAL FIELD

The present invention relates to a fuel cell system, more particularly a purge control in a fuel cell system having an anode gas circulation system.

BACKGROUND ART

A fuel cell is an electrochemical device to convert chemical energy of fuel gas such as hydrogen gas and oxidant gas containing oxygen supplied thereto, directly to electric energy which is extracted from electrodes provided on both sides of an electrolyte thereof. A fuel cell using a solid polymer electrolyte membrane has low operation temperature and can be easily handled, and therefore, it has been a focus of attention as a power source for an electric vehicle.

The solid polymer electrolyte membrane is required to be retained in a moderately humidified state in order to exert oxidant gas or the both gases are humidified to be supplied to the fuel cell. Thus, water added for the humidification and water produced by a power generation reaction in the fuel cell are condensed and may cause clogging or blocking of a gas passage in the fuel cell, depending on operating conditions of the fuel cell.

Moreover, in a fuel cell using air as the oxidant gas, nitrogen contained in the air passes through a solid polymer membrane thereof, and accumulates in a fuel gas circulation system. Consequently, a fuel gas partial pressure decreases at a fuel electrode of the fuel cell, lowering operation efficiency thereof. In order to resolve the clogging and the accumulation of nitrogen, purging is performed for the fuel gas circulation system.

Japanese Patent Laid-Open Publication No. 2002-243417 discloses a fuel cell system which removes impurities accumulated in a hydrogen gas circulation system by opening a purge valve provided in the system and releasing anode off-gas to outside of the system.

DISCLOSURE OF INVENTION

In the system described above, however, even in the case that clogging in the hydrogen gas circulation system is required to be resolved, hydrogen containing fuel gas is released to the outside of the system through the purge valve, whereby operation efficiency thereof is lowered.

The present invention was made in the light of the problem. An object of the present invention is to provide a fuel cell system which removes clogging of gas passages in the fuel cell without lowering the operation efficiency thereof.

An aspect of the present invention is a fuel cell system comprising: a fuel cell to be supplied with a gas for power generation, the gas unused for the power generation to be discharged out of the fuel cell; a circulation flow path through which the gas discharged out of the fuel cell is resupplied to the fuel cell; a variable flow rate circulation pump for circulating the gas through the circulation flow path; a valve for discharging the gas in the circulation flow path to the outside of the circulation flow path; a voltage sensor for measuring voltage of the fuel cell; and a controller for controlling the circulation pump and the valve, wherein the circulation pump and the valve are controlled based on the voltage measured by the voltage sensor.

BRIEF DESCRIPTION OF THE DRAWINGS

The invention will now be described with reference to the accompanying drawings wherein.

BEST MODE FOR CARRYING OUT THE INVENTION

Embodiments of the present invention will be described in detail with reference to the drawings. In all of the embodiments, described is a fuel cell system suitable for a fuel cell vehicle.

First Embodiment

Figure 1:
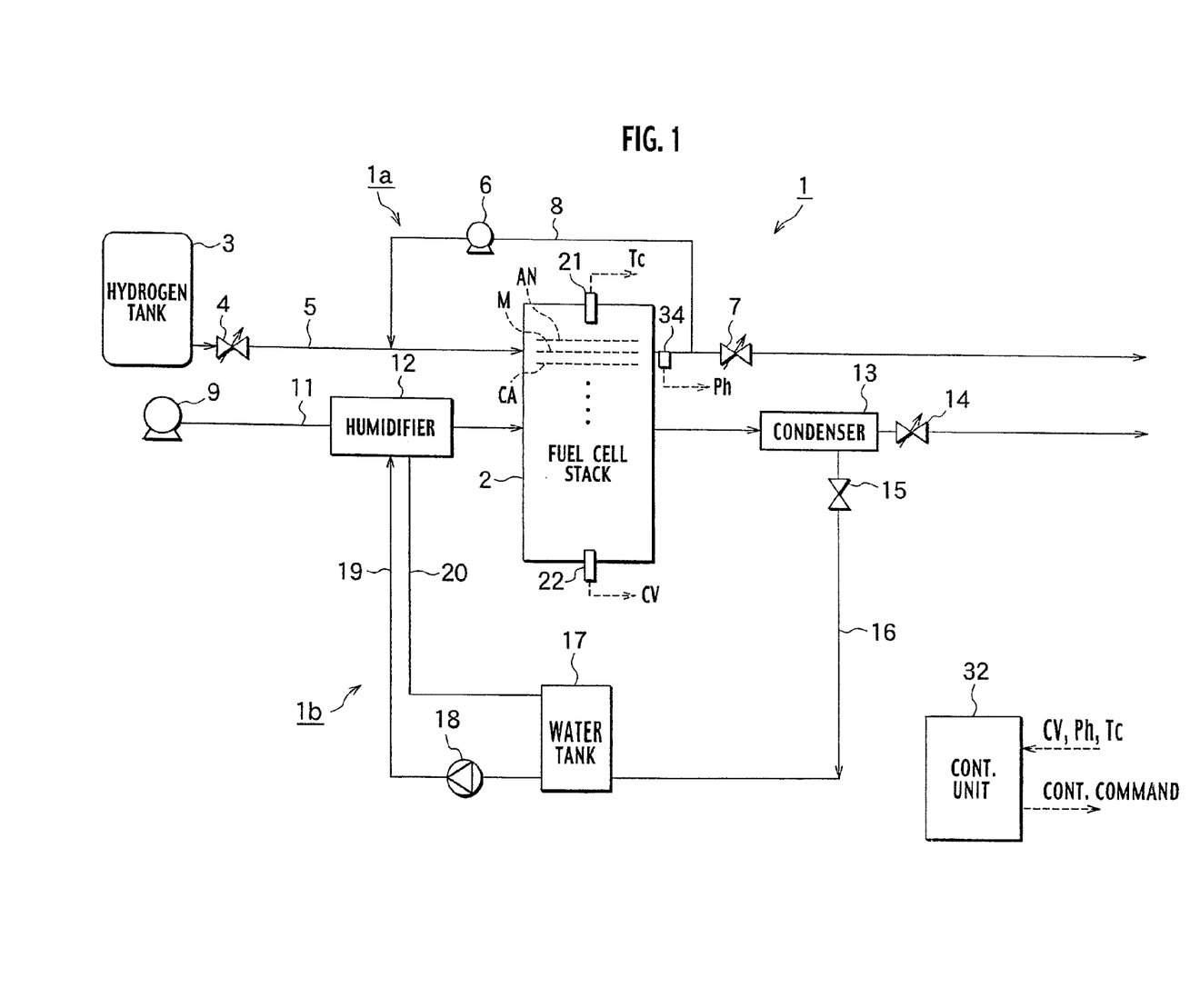
FIG. 1 is a block diagram of a fuel cell system according to a first embodiment of the present invention.

As shown in FIG. 1, a fuel cell system 1 includes a fuel cell stack 2, a hydrogen gas supply system 1a which supplies hydrogen gas as fuel gas to the fuel cell stack 2, an air supply system 1b which supplies air to the fuel cell stack 2, and a control unit 32.

The hydrogen gas supply system 1a includes: a hydrogen tank 3 which stores hydrogen gas; a pressure control valve 4 which regulates pressure of the hydrogen gas taken out of the hydrogen tank 3; a hydrogen gas supply line 5 through which the pressure control valve 4 and the fuel cell stack 2 are communicated with each other; a hydrogen circulation pump 6 which feeds hydrogen gas discharged from the fuel cell stack 2 back to an inlet of the fuel cell stack 2 and circulates the hydrogen gas through a hydrogen gas circulation flow path 8; and a purge valve 7 which discharges the hydrogen gas discharged from the fuel cell stack 2 to the outside of the system.

The air supply system 1b includes: a compressor 9 which takes in air from the outside of the system and compresses the air; a humidifier 12 which humidifies the compressed air to supply the humidified air to the fuel cell stack 2; a condenser 13 which collects water from the air discharged from the fuel cell stack 2; a pressure control valve 14 which regulates pressure of the discharged air; a water tank 17 which stores the water collected by the condenser 13; and a water pump 18 which sends the water in the water tank 17 to the humidifier 12.

The fuel cell stack 2 is formed of a plurality of unit cells stacked on one another. Each of the cells has an anode AN, a cathode CA, and a solid electrolyte membrane M sandwiched therebetween, wherein the hydrogen gas is supplied to the anode AN and the air is supplied to the cathode CA. In the fuel cell stack 2, provided are: a temperature sensor 21 which detects a temperature Tc of the fuel cell stack 2; a cell voltage sensor 22 which detects cell voltages CV of the respective cells of the fuel cell stack 2; and a pressure sensor 34 which detects hydrogen gas pressure at an outlet of the fuel cell stack 2.

The hydrogen gas discharged from the fuel cell stack 2 is pressure-fed and resupplied to the fuel cell stack 2 through the hydrogen gas circulation flow path 8 by the hydrogen circulation pump 6. The hydrogen gas from the hydrogen tank 3 is introduced into the hydrogen gas circulation flow path 8 on the downstream of the hydrogen circulation pump 6 and supplied to the fuel cell stack 2.

When impurities such as nitrogen, CO and water are accumulated in the hydrogen gas circulation flow path 8 or when starting up the system, the purge valve 7 is opened to release the circulating hydrogen gas to the outside of the circulation flow path 8. The operation of this purging operation will be described later.

Each cell voltage CV of the fuel cell stack 2 is detected by the cell voltage sensor 22 and the detected value is sent to the control unit 32. Moreover, the temperature Tc of the fuel cell stack 2 and the hydrogen gas pressure Ph are detected by the temperature sensor 21 and the pressure sensor 34, respectively, and are sent to the control unit 32.

The control unit 32 is a controller which controls the fuel cell system 1 based on the values of CV, Ph and Tc detected by the sensors 21, 22 and 34 and controls the hydrogen circulation pump 6 and the purge valve 7 based on the cell voltages CV detected by the cell voltage sensor 22.

In this embodiment, the control unit 32, although not particularly limited, is formed of a microprocessor including a CPU, a program ROM, a work RAM and an input-output interface.

The purge valve 7 is a valve which allows the hydrogen gas circulation flow path 8 and the outside of the system to communicate/non-communicate with each other and has a variable opening which can be adjusted arbitrarily.

The compressor 9 compresses air taken in from the outside of the system. The compressed air is humidified by the humidifier 12 provided on an air supply line 11 and supplied to the fuel cell stack 2.

Air discharged from the fuel cell stack 2 contains water produced in reaction of power generation in the fuel cell stack 2. The condenser 13 provided downstream of the fuel cell stack 2 collects the water. On a line downstream of the condenser 13, provided is the pressure control valve 14 which provides the air supply system 1b with a desired pressure.

The water condensed and collected by the condenser 13 is introduced into the water tank 17 via an ON/OFF valve 15 in a water channel 16.

The water in the water tank 17 is pressure-fed by the pump 18 and supplied to the humidifier 12 through a feed line 19. When excessive water is supplied to the humidifier 12, the excess water is returned to the water tank 17 through a return line 20.

Next, description will be given to operations.

A requested output (=required power) of the fuel cell is set based on a throttle opening of an accelerator operated by a driver, and the like. The hydrogen gas and air are regulated according to this requested output and supplied to anode AN side passage and cathode CA side passage of the fuel cell stack 2, respectively.

Figure 2:
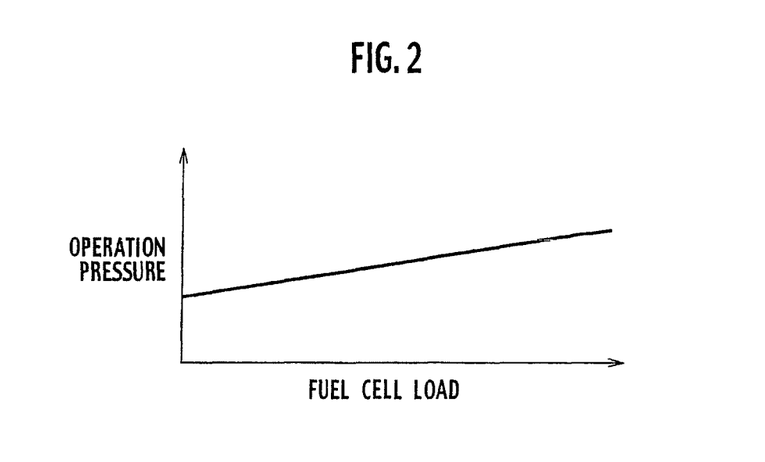
FIG. 2 shows relationship between fuel cell load and operation pressure of a fuel cell of the first embodiment.

As shown in FIG. 2, a hydrogen gas pressure in the anode AN and an air pressure in the cathode CA, both of which are represented as operation pressure, are set to be higher as the fuel cell load becomes heavier.

In a normal operation, a closed loop is formed in the hydrogen gas supply system 1a. Specifically, in the closed loop, the hydrogen gas discharged from an anode side outlet of the fuel cell stack 2 is fed to an anode side inlet and circulated through the hydrogen gas circulation flow path 8 by the hydrogen circulation pump 6.

Inside the fuel cell stack 2, nitrogen in the air supplied to the cathode CA passes through the solid polymer electrolyte membrane M to the anode AN. Thus, concentration of impurities in anode gas in the closed loop is gradually increased. Moreover, the gas passage in the stack 2 is clogged with humidifying water or produced water. As a result, the cell voltages CV of the fuel cell stack are lowered.

When the cell voltage sensor 22 detects the cell voltages CV and the control unit 32 determines, based on the detected cell voltages, that the cell voltages are lowered, a purge operation is performed. Specifically, in the purge operation, the purge valve 7 is temporarily opened and the gas containing impurities in the hydrogen gas circulation flow path 8 is released to the outside of the system.

Figure 4:
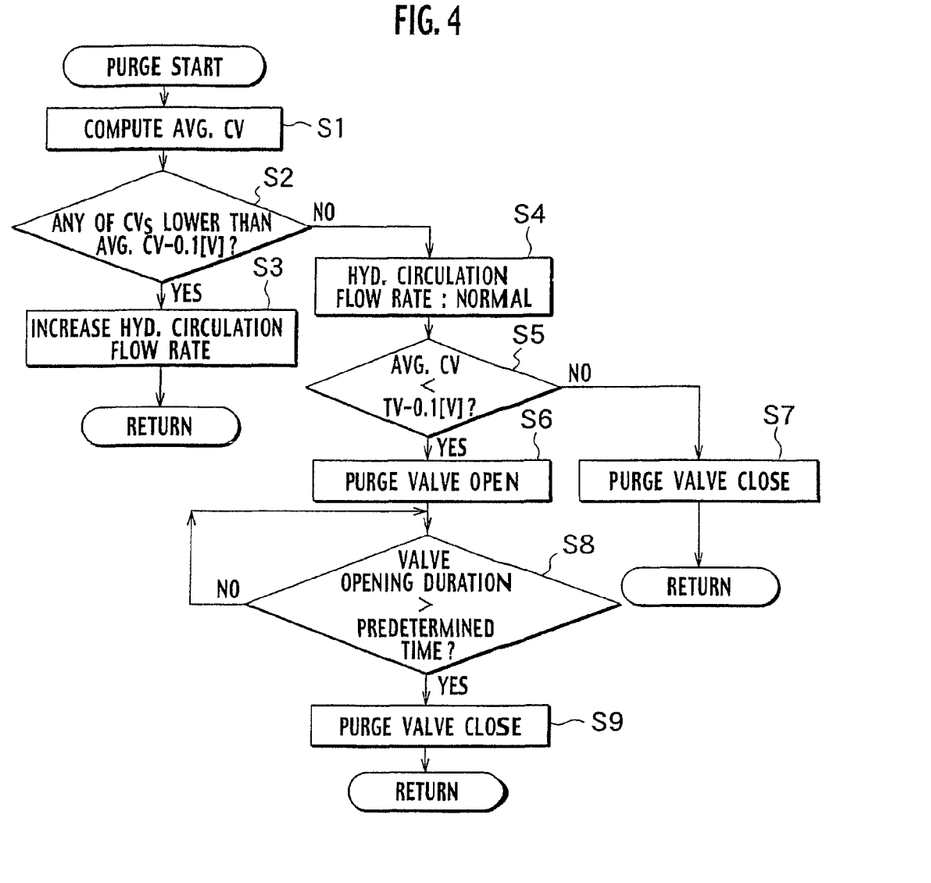
FIG. 4 is a flowchart of a purge operation of the first embodiment.

Next, the purge operation will be described with reference to the flowchart of FIG. 4. A series of processes shown in the flowchart is repeatedly carried out every predetermined time.

First, in S1, the control unit 32 reads each cell voltage CV of the fuel cell stack 2 from the cell voltage sensor 22 and computes an average cell voltage AVG. CV of all the cells. Next, in S2, it is determined whether or not there is a cell with its voltage lower than the average cell voltage AVG. CV computed in S1 by a predetermined value (for example, 0.1 V) or more.

When there exists even one lower voltage cell, it is determined that clogging has occurred in the gas passage in the fuel cell stack and the processing proceeds to S3. When there exists no relevant cell, the processing proceeds to S4. In other words, a clogging detector is thus formed of the cell voltage sensor 22 and the control unit 32.

In S3, in order to resolve the clogging, the hydrogen circulation pump 6 is speeded up and a hydrogen gas circulation flow rate Qh is increased.

Figure 5:
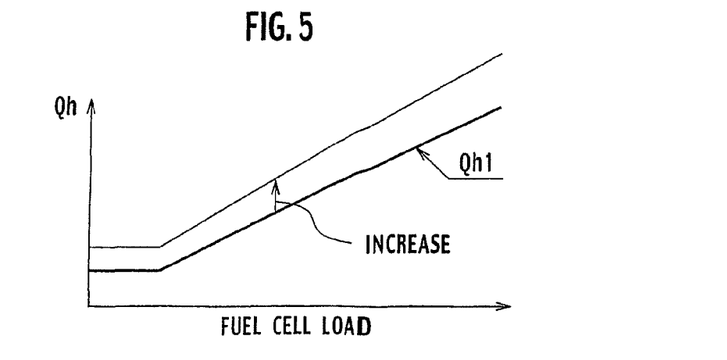
FIG. 5 shows a relationship between fuel cell load and hydrogen gas circulation flow rate Qh of the first embodiment.

As indicated by a thick line in FIG. 5, a hydrogen gas circulation flow rate Qh1 in a normal operation is increased at a constant rate as fuel cell load (output current) of the fuel cell stack 2 increases, while in a low load range, regardless of a change in the fuel cell load, the flow rate Qh is maintained substantially constant for ensuring even distribution of the supplied gas. In accordance with characteristics of the fuel cell to be used, the increase of the hydrogen gas circulation flow rate Qh can be adjusted. In FIG. 5, the hydrogen gas circulation flow rate Qh is increased at a substantially constant increase rate as the fuel cell load increases. However, the flow rate may be increased by a substantially constant increase amount (indicated by a thin line in FIG. 5) over the whole fuel cell load range, or alternatively, the increase rate may be varied along with the load.

In S4, the normal hydrogen gas circulation flow rate Qh1 corresponding to the thick line in FIG. 5 is set.

In S5, it is determined whether or not the average cell voltage AVG. CV is lower than a table value TV, which is previously stored in a ROM of the control unit 32, by 0.1 V.

Accordingly, if the average cell voltage AVG. CV is lower than the table value TV by 0.1 V or more, the processing proceeds to S6, and if not, the processing proceeds to S7.

The lowering of the average cell voltage AVG. CV is caused by accumulation of impurities in the hydrogen gas circulation flow path 8 due to diffusion of nitrogen from the cathode CA or the like. If the average cell voltage AVG. CV is lowered by a predetermined value (for example, 0.1 V) or more, the purge valve 7 is opened for a predetermined period of time (for example, 5 seconds) in S6 and S8. Accordingly, nitrogen and the like are discharged to the outside of the system together with the hydrogen gas in the hydrogen gas circulation flow path 8. Thus, the average cell voltage AVG. CV is restored.

Figure 3:
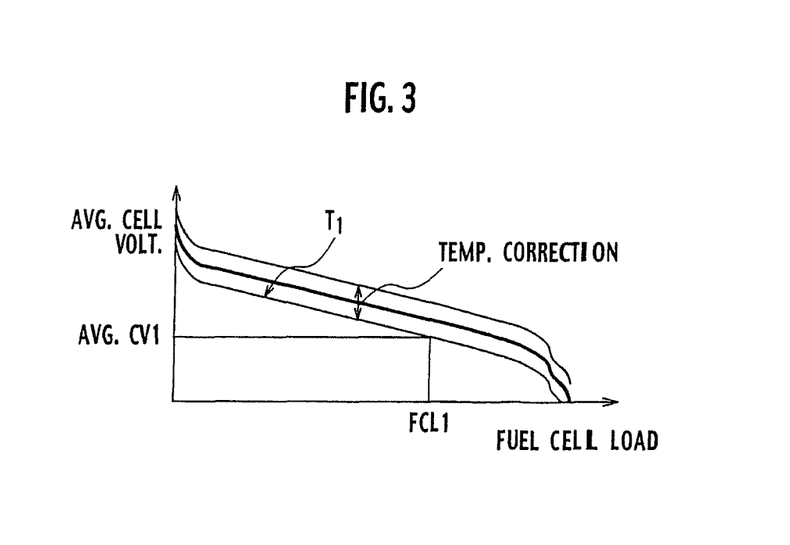
FIG. 3 shows relationship between fuel cell load and average cell voltage of the fuel cell of the first embodiment.

Here, for detecting lowering of the average cell voltage AVG. CV, a judgment is performed in the following manner. Voltage characteristics (I-V characteristics) of each of the fuel cells with respect to the fuel cell load as shown in FIG. 3 are stored in the control unit 32 as table data, from which a voltage characteristic curve in the full range of the fuel cell load, giving a certain average cell voltage at a certain temperature T1 is obtained. A correction is then made to put this voltage characteristic as voltage characteristic at the measured fuel cell temperature Tc (=T1). An estimated average cell voltage AVG. CV1 for a current fuel cell load FCL1 is obtained from the corrected voltage characteristic and compared with the average cell voltage AVG. CV in the actual operation.

As described above, the clogging of gas passages in the fuel cells can be eliminated by increasing the hydrogen gas circulation flow rate Qh. Thus, in this embodiment, for the lowering of the cell voltages due to the clogging, the hydrogen gas circulation flow rate Qh is increased without opening the purge valve 7. Consequently, amount of the hydrogen gas to be discharged to the outside of the system is suppressed and fuel gas consumption is improved.

For the lowering of the cell voltages caused by the increasing concentration of impurities in the circulated hydrogen gas due to nitrogen diffusion or the like, the purge valve 7 is opened to discharge the impurities. Thus, the cell voltages can be surely restored.

Furthermore, the lowering of the cell voltages due to long-term factors, such as aged deterioration of the cells, may be corrected by learning. Thus, the determinations or judgments described above are possible even if the average cell voltage of the fuel cell gradually drops.

Note that, in S2, the cause of the lowering of the cell voltages is determined based on the cell-to-cell variation in the cell voltages CV. However, the cause of the lowering of the cell voltages may be determined based on a hydrogen concentration detected by a hydrogen concentration sensor provided on a hydrogen gas circulation system.

Although, in the fuel cell system 1 of this embodiment, the hydrogen circulation pump is used as means for circulating hydrogen, an ejector may be used in conjunction therewith.

Second Embodiment

Figure 6:
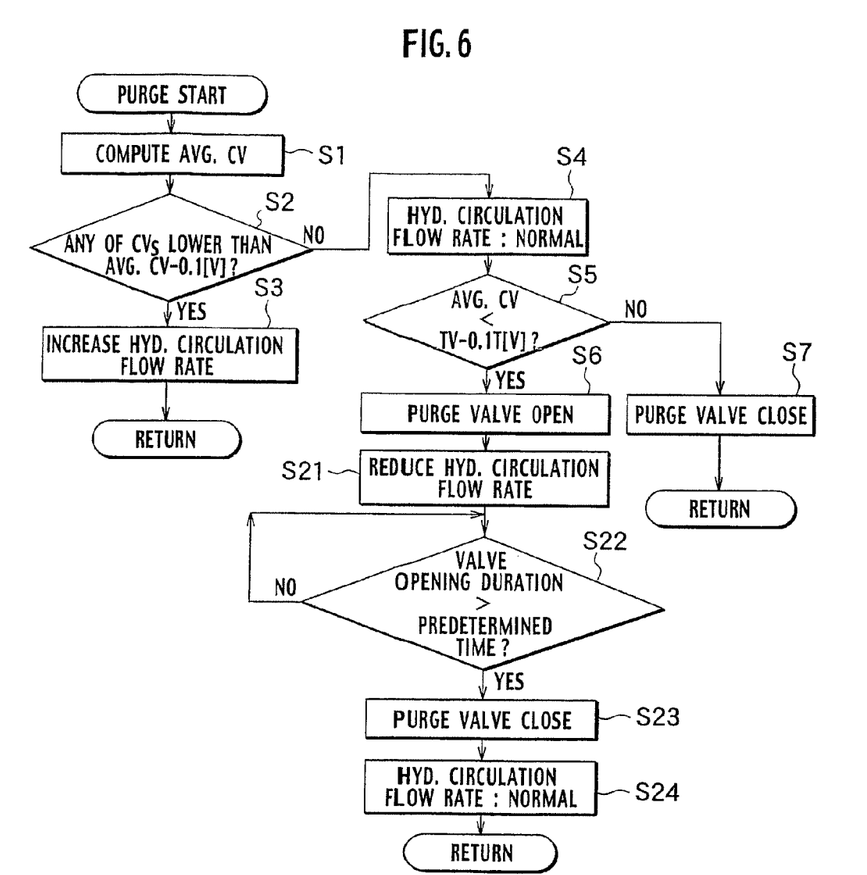
FIG. 6 is a flowchart of a purge operation of a second embodiment of the present invention.

A second embodiment of the present invention has the same configuration as that of the first embodiment shown in FIG. 1 and is different from the first embodiment only in an operation thereof. With reference to the flowchart shown in FIG. 6, description will be given to the only difference. S1 to S7 in FIG. 6 are the same as those of the first embodiment shown in FIG. 4.

After the purge valve 7 is opened in S6, a hydrogen gas circulation flow rate Qh2 of the hydrogen circulation pump 6 is reduced in S21. Opening the purge valve 7 downstream the fuel cell stack 2 necessarily increases a flow rate of hydrogen gas supplied to the fuel cell stack 2. This will compensate for the reduction in the hydrogen gas circulation flow rate Qh2. The flow rate Qh2 is set to be smaller in order to efficiently discharge high concentration of impurities of gas in the hydrogen gas circulation flow path 8 to the outside of the system. Thus, a nitrogen concentration can be reduced in a shorter period of time.

Figure 7:
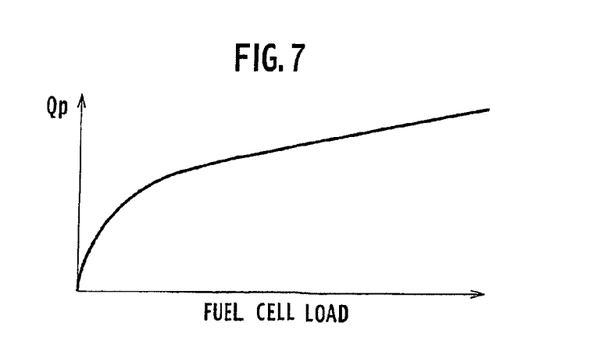
FIG. 7 shows a relationship between fuel cell load and purge flow rate Qp of the second embodiment.

In this embodiment, the reduction in the flow rate Qh2 is set to be approximately equivalent to the increase in the flow rate of hydrogen gas supplied to the fuel cell stack 2 when the purge valve 7 is opened. A purge flow rate Qp at the purge valve 7 when the purge valve 7 is opened changes depending on pressure difference between upstream and downstream of the purge valve and a fluid flowing therethrough. In this embodiment, as shown in FIG. 2, the hydrogen gas pressure (=operation pressure) is changed according to the fuel cell load. Therefore, if the fuel cell load is determined, the flow rate Qp can be obtained, whereby table data of the graph as shown in FIG. 7 is provided.

The value obtained by subtracting the flow rate Qp from the hydrogen gas circulation flow rate Qh obtained from the curve of thick line in FIG. 5 (Qh-Qp) is set as the circulation flow rate Qh2 of the hydrogen circulation pump 6.

Moreover, the amount of reduction in the hydrogen gas circulation flow rate Qh2 in the purge operation may be set to be smaller, for example, than the purge flow rate Qp, as long as the fuel cell to be used is not particularly affected thereby. In this case, efficiency in purging the hydrogen gas circulation flow path 8 is further improved.

The processing proceeds to S22 after S21 and the purge valve 7 is kept open until valve opening time of the purge valve 7 reaches a predetermined time. After the predetermined time has elapsed in S22, the processing proceeds to S23 and the purge valve 7 is closed. Subsequently, in S24, the hydrogen gas circulation flow rate Qh is restored to the normal flow rate Qh1 and the processing returns.

In this embodiment, unlike the first embodiment, the hydrogen gas circulation flow rate Qh is reduced when opening the purge valve. Thus, the duration of purging can be shortened while suppressing unnecessary discharge of hydrogen.

Moreover, in this embodiment, when the cell voltages are not uniformly lowered, that is, when the voltages are lowered due to the clogging, the hydrogen gas circulation flow rate Qh is increased in S2 and S3. By simultaneously opening the purge valve in this event, the purge operation can be promptly carried out.

The increase in the hydrogen gas circulation flow rate Qh is accompanied by an increase in power consumption of the hydrogen circulation pump 6. In consideration of the power consumption, a selection may be made between only increasing the flow rate Qh and the combination of opening the purge valve with increasing the flow rate Qh.

Third Embodiment

Figure 8:
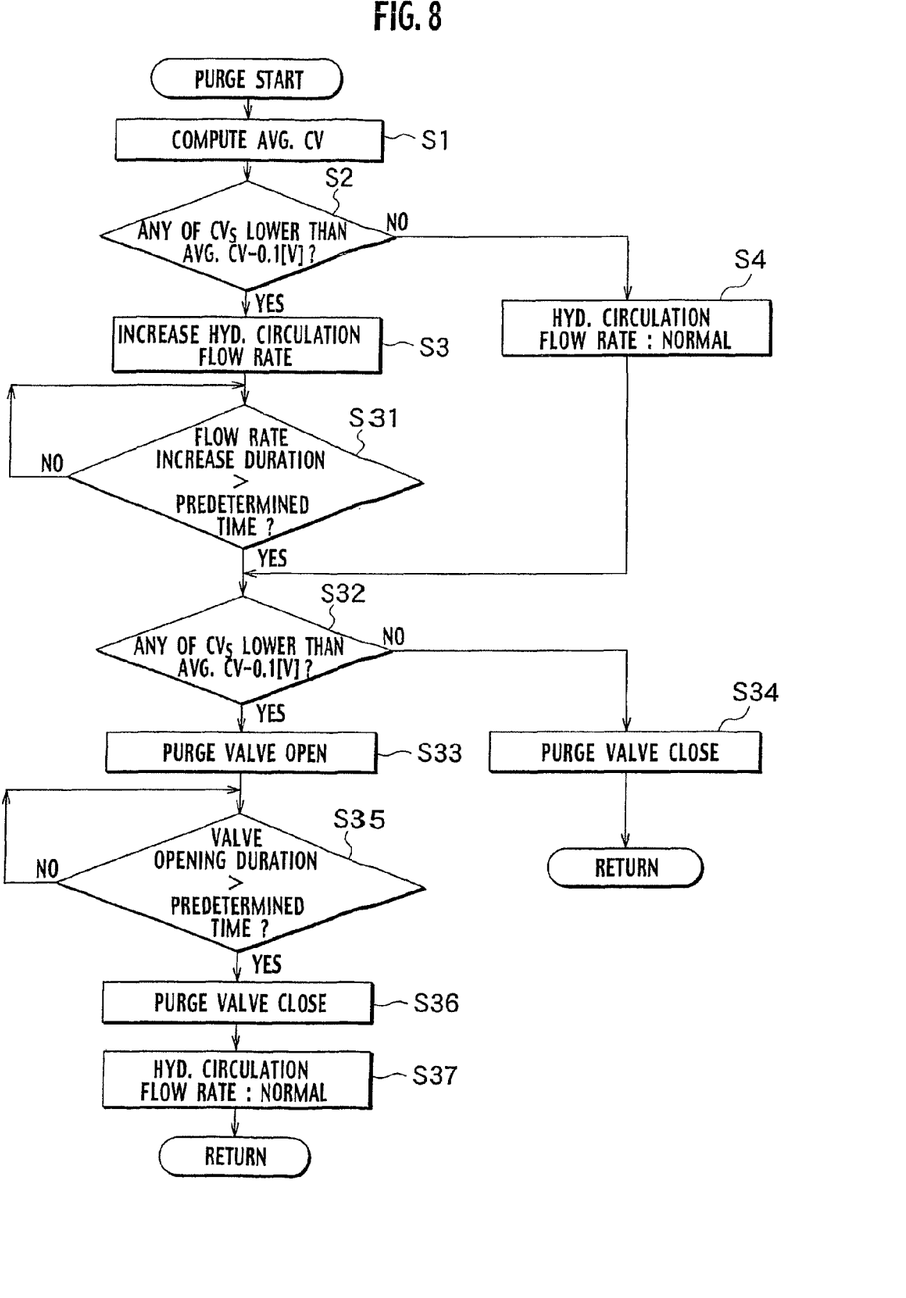
FIG. 8 is a flowchart of a purge operation of a third embodiment of the present invention.

A third embodiment has the same configuration as that of the first embodiment shown in FIG. 1 and is different from the first embodiment only in an operation thereof. With reference to the flowchart shown in FIG. 8, description will be given to the only differences. S1 to S4 in FIG. 8 are the same as those of the first embodiment shown in FIG. 4.

After the hydrogen gas circulation flow rate Qh is increased in S3, the processing proceeds to S31 and the circulation flow rate is kept until a predetermined period of time (for example, 5 seconds) elapses. After the predetermined time has elapsed in S31, the processing proceeds to S32. Also when the hydrogen gas circulation flow rate Qh is set to the normal value Qh1 in S4, the processing proceeds to S32.

In S32, the average cell voltage AVG. CV of all the cells, which is computed in S1, is compared with the cell voltage CV of each cells. Accordingly, it is determined whether or not there is a cell having voltage lower than the average cell voltage AVG. CV by 0.1 V or more. If even one such cell exists, the processing proceeds to S33 and the purge valve 7 is opened and kept open until a predetermined period of time (for example, 5 seconds) elapses in S35. After the predetermined time has elapsed in S35, the processing proceeds to S36 and the purge valve 7 is closed. Subsequently, in S37, the hydrogen gas circulation flow rate Qh is returned to the value Qh1 in the normal operation. Thereafter, the processing returns to the start.

Meanwhile, when there exists no cell which satisfies the condition described above in S32, the processing proceeds to S34 and the purge valve 7 is closed. Thereafter, the processing returns to the start.

In this embodiment, the same logic is used in both of S2 and S32 to simplify the determination whether nitrogen and the like are diffused into the anode gas.

Specifically, the case where lowering of the cell voltages are caused by nitrogen diffusion is less urgent than the case where lowering thereof is caused by clogging. Also in this case, as the concentration of nitrogen increases, there occurs variation in the cell voltages CV. For the reasons described above, the following two steps are taken. Specifically, when the variation in the cell voltages CV is detected, first, the hydrogen gas circulation flow rate is increased without discharging the hydrogen gas to the outside of the system, without specifying the cause of the lowered cell voltages. If the lowering of the cell voltages cannot be resolved even after taking the step described above, the purge valve 7 is opened. Consequently, even if the cause of the lowered cell voltages is the clogging or the nitrogen diffusion and the like, performance of the fuel cell and the like are not deteriorated.

Whether to adopt the method of the first embodiment or to use the method of the third embodiment may be determined, taking into consideration the power consumption of the circulation pump and lowering of efficiency caused by nitrogen diffusion.

In other words, the fuel cell system 1 according to the present invention includes: the fuel cell stack 2 which is supplied with fuel gas to the anode AN thereof and oxidant gas to the cathode CA thereof for power generation; the anode gas circulation flow path 8 which returns the fuel gas discharged from the outlet of the anode gas passage in the fuel cell stack 2, to the inlet of the anode gas passage; the variable flow rate hydrogen circulation pump 6 which circulates the gas in the anode gas circulation flow path 8; the purge valve 7 which discharges the anode off-gas from the outlet of the anode gas passage to the outside of the system; the cell voltage sensor 22 for measuring the cell voltages CV of the fuel cell stack 2; and the controller 32 for controlling the hydrogen circulation pump 6 and the purge valve 7 based on the cell voltages CV measured by the cell voltage sensor 22.

The cell voltage sensor 22 measures voltages of a plurality of cells included in the fuel cell stack 2, respectively. The controller 32 controls, in purge operation, the hydrogen circulation pump 6 to have a smaller circulation flow rate Qh, and the purge valve 7 to have a larger amount of the gas discharged, as there are more cells of which voltages are significantly lowered, or as the variation between the cell voltages is smaller, when the cell voltages are lowered.

The fuel cell system 1 further includes clogging detector for detecting clogging of the anode gas passages in the fuel cell stack 2. This clogging detector determines possibility of clogging to be low, as there are more cells of which voltages are significantly lowered, or as the variation between the cell voltages is smaller, when the cell voltages are lowered.

The controller 32 controls, in the purge operation, the hydrogen circulation pump 6 to have a smaller circulation flow rate Qh, and the purge valve 7 to have a larger amount of the gas discharged, as the possibility of clogging becomes lower, when the cell voltages are lowered.

Moreover, in the fuel cell system 1, in the beginning of the purge operation, the controller 32 sets the circulation flow rate Qh of the hydrogen circulation pump 6 to be larger than the circulation flow rate Qh1 in the normal operation. Thereafter, if increase rate of the cell voltages CV are low, the controller 32 sets the amount of the gas discharged from the purge valve 7 to be large.

The present disclosure relates to subject matters contained in Japanese Patent Application No. 2003-333656, filed on Sep. 25, 2003, the disclosure of which is expressly incorporated herein by reference in its entirety.

The preferred embodiments described herein are illustrative and not restrictive, and the invention may be practiced or embodied in other ways without departing from the spirit or essential character thereof. The scope of the invention being indicated by the claims, and all variations which come within the meaning of claims are intended to be embraced herein.

INDUSTRIAL APPLICABILITY

In a fuel cell system according to the present invention, voltages of the respective cells of the fuel cell are measured, and a gas circulation pump with variable flow rate, provided on an anode gas circulation flow path, and a purge valve which discharges anode off-gas to the outside of the system, are controlled based on the measured cell voltages. Thus, clogging of gas passages in the fuel cell, causing voltage drops in the cell voltages, can be detected, and the clogging can be eliminated by increasing the flow rate of the gas circulation pump. Moreover, frequency of discharge of hydrogen by the purge valve can be reduced. Thus, the present invention is industrially applicable as a technology for improving fuel gas consumption of the fuel cell system.

The invention claimed is:

1. A fuel cell system comprising:
a fuel cell comprising a plurality of cells stacked on one another and supplied with a gas for power generation, the gas unused for the power generation to be discharged out of the fuel cell;
a circulation flow path through which the gas discharged out of the fuel cell is resupplied to the fuel cell;
a voltage sensor configured to measure voltages of the respective cells of the fuel cell;
a variable flow rate circulation pump provided on the circulation flow path to circulate the gas through the circulation flow path, wherein the circulation pump is operative to adjust a flow rate of the gas in the circulation flow;
a valve provided on the circulation flow path to discharge the gas in the circulation flow path to the outside of the circulation flow; and
a controller for controlling the circulation pump and the valve, the controller being programmed to control the variable flow rate circulation pump to increase the flow rate of the gas in the circulation flow path if some of the measured voltages are below a predetermined range which includes an average value of the measured voltages of the respective cells, and to open the valve if all of the measured voltages are within the predetermined range and the average value of the measured voltages of the respective cells is lower than a predetermined value.

2. The fuel cell system of claim 1, wherein
if some of the measured voltages of the respective cells are within the predetermined range, the circulation pump reduces a flow rate of the gas circulated, and the valve increases an amount of the gas to be discharged, as the average value of the voltages of the respective cells becomes lower.

3. The fuel cell system of claim 1, wherein
the circulation pump reduces a flow rate of the gas circulated, and the valve increases an amount of gas to be discharged, as a variation in the measured voltages between the cells becomes smaller.

4. The fuel cell system of claim 1, further comprising:
a clogging detector which also monitors the voltages of the respective cells and determines a possibility of clogging of a gas passage in the fuel cell based on the monitored voltages of the respective cells, and,
wherein the circulation pump reduces a flow rate of the gas circulated, and the valve increases an amount of gas to be discharged, when the possibility of the clogging is determined to be low.

5. The fuel cell system of claim 4, wherein
the clogging detector is programmed to determine the possibility of clogging in such a manner that the possibility of clogging becomes lower, as the average value of the voltages of the respective cells becomes lower, if some of the monitored voltages of the respective cells are within the predetermined range.

6. The fuel cell system of claim 4, wherein
the clogging detector is programmed to determine the possibility of clogging in such a manner that the possibility of clogging becomes lower, as a variation in the measured voltages between the cells becomes smaller.

7. The fuel cell system of claim 1, wherein
the controller controls the valve to increase an amount of gas to be discharged, if a rate of increase in the measured voltage is kept below a predetermined rate while controlling the circulation pump to increase the flow rate of the gas circulated more than that in a normal operation.

8. A method for improving fuel gas consumption in power generation of fuel cells, wherein the fuel gas unused for the power generation is resupplied to the fuel cells through a fuel gas circulation system which includes a variable flow rate circulation pump operative to adjust a flow rate of the fuel gas circulating through the fuel gas circulation system and a valve for discharging the fuel gas in the fuel gas circulation system to the outside thereof, the method comprising:
monitoring output voltages of the respective fuel cells by a voltage sensor;
determining, by a controller, whether to increase the flow rate of the fuel gas in the fuel gas circulation system or to open the valve based on the monitored output voltages;
controlling, by the controller, the variable flow rate circulation pump to increase flow rate of the fuel gas in the fuel gas circulation system, if some of the monitored output voltages are out of a predetermined range which includes an average value of the monitored output voltages; and
opening, by the controller, the valve to discharge the fuel gas out of the fuel gas circulation system, if all of the monitored output voltages are within the predetermined range and the average value of the monitored output voltages is lower than a predetermined value.

9. The fuel cell system of claim 1, wherein
the circulation pump is controlled to decrease the flow rate of the gas in the circulation flow path when the valve is being opened.

* * * * *